(12) United States Patent
Vu

(10) Patent No.: US 11,035,711 B2
(45) Date of Patent: Jun. 15, 2021

(54) DISPENSERS AND RELATED METHODS

(71) Applicant: Dac V. Vu, Tustin, CA (US)

(72) Inventor: Dac V. Vu, Tustin, CA (US)

(*) Notice: Subject to any disclaimer, the term of this patent is extended or adjusted under 35 U.S.C. 154(b) by 0 days.

(21) Appl. No.: 16/530,655

(22) Filed: Aug. 2, 2019

(65) Prior Publication Data

US 2020/0041322 A1     Feb. 6, 2020

Related U.S. Application Data

(60) Provisional application No. 62/714,410, filed on Aug. 3, 2018.

(51) Int. Cl.
    *G01F 11/26*        (2006.01)
    *B65D 25/52*        (2006.01)
    *B65D 47/04*        (2006.01)

(52) U.S. Cl.
    CPC .............. *G01F 11/26* (2013.01); *B65D 25/52* (2013.01); *B65D 47/04* (2013.01)

(58) Field of Classification Search
    CPC ....... G01F 11/26; G01F 11/261; B65D 25/52; B65D 47/04
    See application file for complete search history.

(56) References Cited

U.S. PATENT DOCUMENTS

| | | | | |
|---|---|---|---|---|
| 3,044,667 A | * | 7/1962 | Lucas | G01F 11/261 222/454 |
| 4,949,880 A | * | 8/1990 | Bradley | A47G 19/18 222/454 |
| 5,480,071 A | * | 1/1996 | Santagiuliana | B65D 83/06 220/254.2 |
| 5,495,964 A | * | 3/1996 | Santagiuliana | B65D 25/52 222/455 |
| 2018/0094959 A1 | * | 4/2018 | Gieske | B65D 47/265 |
| 2020/0041322 A1 | * | 2/2020 | Vu | B65D 47/04 |

FOREIGN PATENT DOCUMENTS

FR            2268252 A3 * 11/1975 ............ G01F 11/261

* cited by examiner

*Primary Examiner* — Vishal Pancholi
*Assistant Examiner* — Bob Zadeh
(74) *Attorney, Agent, or Firm* — Klein, O'Neill & Singh, LLP

(57) ABSTRACT

Dispensers for container assemblies and related methods are disclosed. The dispenser can provide for a measured quantity of a substance. The dispenser can allow for retaining of a predetermined measured quantity of a substance by inversion of the container assembly. The dispenser can be used in conjunction with a flip cover of a lid of the container assembly for dispensing of the measured quantity.

20 Claims, 3 Drawing Sheets

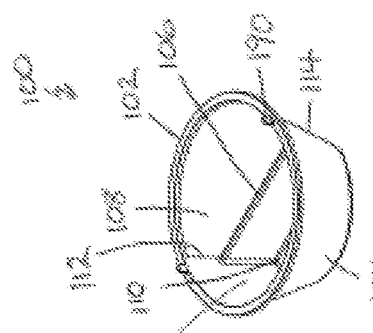
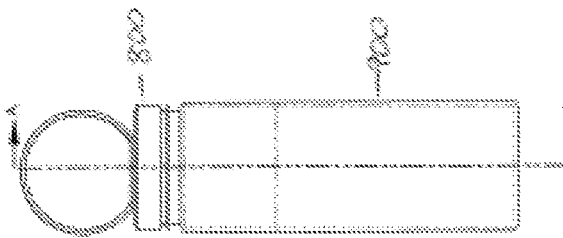
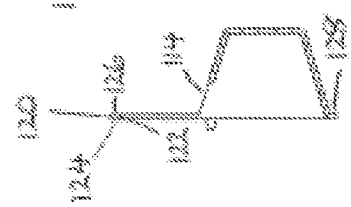
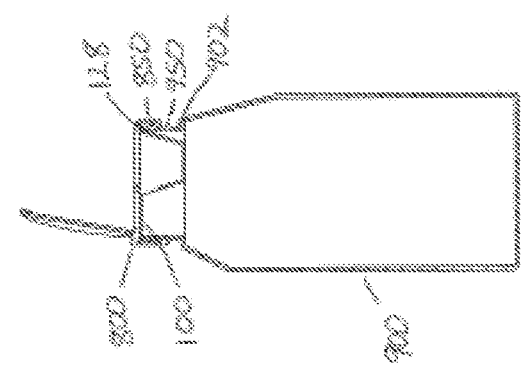
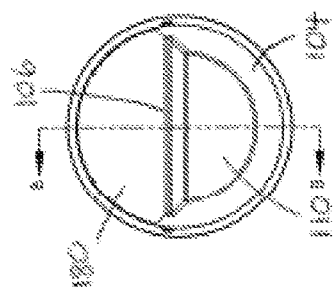
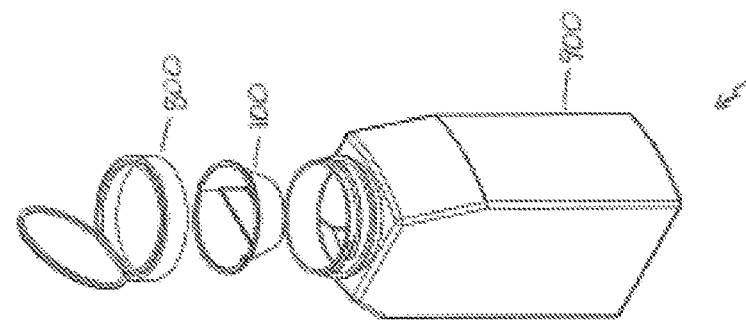
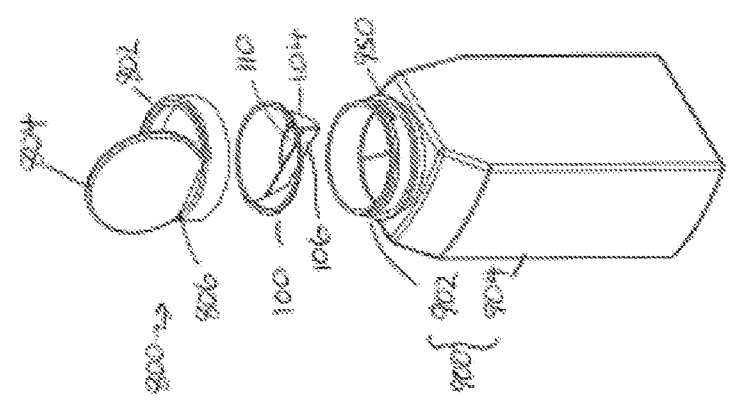

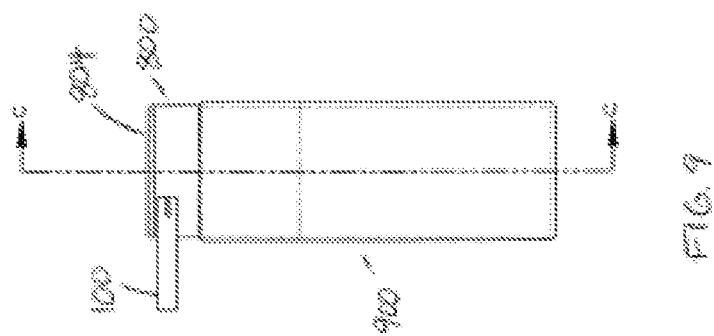
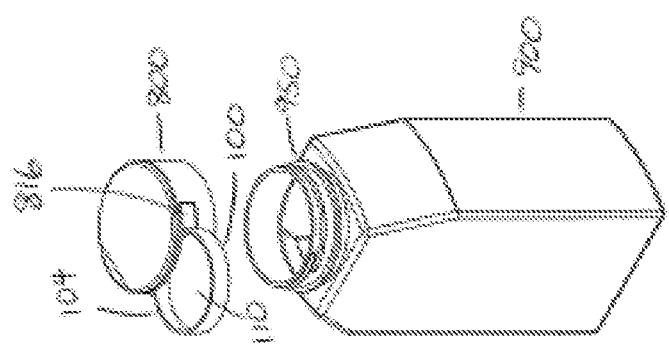
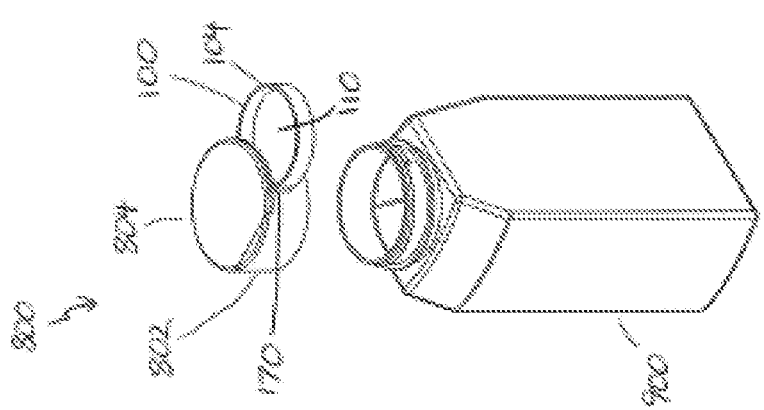

DISPENSERS AND RELATED METHODS

FIELD OF THE ART

The present disclosure pertains to dispensers and related methods and more particularly to dispensers for measured amounts of a substance.

BACKGROUND

Generally, people keep supplies of ingredients, such as herbs, spices, and condiments, stored in containers in kitchens for ready availability. In cooking or baking, people can then pour or extract a desired quantity of the ingredient. Often, people can freehand the quantity desired by visually estimating how much of the ingredient they have poured out. Some containers can have screw type lids with flip covers that can be opened to accommodate pouring the ingredient without unscrewing the lid.

For more precise measurement of the ingredients, people often will pour the ingredient into measuring spoons or measuring cups.

SUMMARY

The present systems, devices, and methods provide a measured quantity of an ingredient without the need for separate measuring spoons or measuring cups. The conventional method of using measuring spoons or measuring cups has been the accepted practice so that the measuring spoon or measuring cup of a desired size can be used.

The present devices and methods provide the ability to pour a measured quantity directly from a container without the need to find or clean a separate measuring spoon. The present devices and methods can provide both options of a measured quantity or freehand pouring as desired.

BRIEF DESCRIPTION OF THE DRAWINGS

These and other features and advantages of the present devices, systems, and methods will become appreciated as the same becomes better understood with reference to the specification, claims and appended drawings wherein:

FIG. 1 is a perspective view of a dispenser in accordance with an exemplary embodiment.

FIG. 2 is a top plan view of the dispenser of FIG. 1.

FIG. 3 is a cross-sectional side view of the dispenser of FIG. 2 as taken along section line B-B.

FIGS. 4A and 4B are exploded assembly perspective views of a container assembly including the dispenser of FIG. 1.

FIG. 5A is a side view of the container assembly of FIGS. 4A and 4B.

FIG. 5B is a cross-sectional side view of the container assembly of FIG. 5A as taken along section line A-A.

FIGS. 8A and 8B are exploded assembly perspective views of an exemplary embodiment of a container assembly.

FIG. 9 is a side view of the container assembly of FIGS. 8A and 8B.

DETAILED DESCRIPTION

Figure 7A:
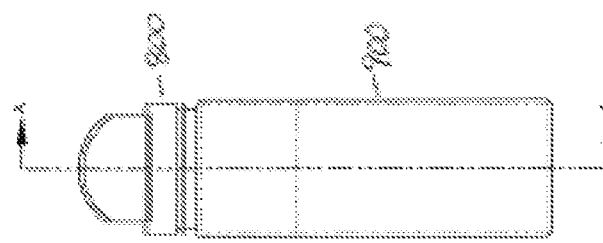
FIG. 7A is a side view of the container assembly of FIGS. 6A and 6B.

The detailed description set forth below in connection with the appended drawings is intended as a description of the presently preferred embodiments of dispensers provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

FIGS. 1-3 illustrate various views of an exemplary embodiment of a measuring dispenser or dispenser 100 for fitment with a container. As shown in FIGS. 1 and 3, the dispenser 100 can comprise body with a top lip ring 102, which is circular and defined by an outer diameter 120, an inner diameter 122, a top surface 124, and an opposed bottom surface 126. As shown in reference to FIGS. 4A and 4B below, it can be understood that the relative orientation of a container assembly 1000 having an opening for coupling to a lid 800, or lid side, as a top or upper side and a container body or container 900 having an enclosed based or bottom side as a bottom or lower side of the container assembly 1000. The term lip ring 102 may alternative be referred to as lid ring 102, which may be used interchangeably.

FIG. 1 is a perspective view of the exemplary embodiment of a dispenser 100 for fitment with a container. The lip ring 102 can have an outer diameter 120 generally similar to an outer diameter of a neck 902 of a container 900, such as that shown in FIG. 4A as described below. The lip ring 102 can have an inner diameter 122 smaller than an inner diameter of the neck 902 of the container 900. As such, a radial thickness of the lip 102 can be greater than a radial thickness of the neck 902 of the container 900, notwithstanding any threading 950.

The smaller inner diameter 122 of the lip ring 102 relative to the inner diameter of the neck 902 of the container 900 allows for a side wall 104 projecting from the lip ring 102, wherein the side wall 104 can be sized and shaped to protrude into the neck 902 of the container 900 when the dispenser 100 is assembled with the container 900.

The side wall 104 can project from the bottom surface 126 of the lid ring 102. The side wall 104 can be defined by an arcuate section of the lid ring 102, and does not form a full circular enclosure. In this way, the side wall 104 can be an arcuate side wall projecting from a portion of the circumference of the lid ring 102.

In some embodiments, the side wall 104 can extend orthogonally relative to the bottom surface 126. For example the side wall 104 can have the shape of an arcuate portion of a side of a truncated cone. In other embodiments, the side wall 104 can extend perpendicularly from the lid ring 102, thereby the side wall 104 having the shape of an arcuate portion of a cylinder. In some embodiments, the side wall 104 can extend parallel to the neck 902 of the container 900.

FIGS. 1-3 show an embodiment where the side wall 104 extends orthogonally relative to the bottom surface 126, such that the side wall 104 tapers radially inward as it extends away from the lid ring 102. The side wall 104 can have the shape of an arcuate portion of a side of a truncated cone. The side wall 104 can be bounded by the lid ring 102 at one end and a bottom wall 110 at an opposed end.

FIG. 2 shows an embodiment of the bottom wall 110 wherein the bottom wall 110 is planar and parallel to a plane defined by the lid ring 102. In alternative embodiments, the bottom wall 110 can be angled relative to the plane defined by the lid ring 102. In other embodiments, the bottom wall 110 can be curved or be comprised of multiple angled surfaces.

As shown in FIGS. 2 and 3, the side wall 104 can extend in an arcuate manner and be bound by two edges 112, 114. FIG. 2 illustrates a top plan view of the dispenser of FIG. 1. FIG. 3 illustrates a cross-sectional side view of the dispenser of FIG. 2 as taken along section line B-B. In some embodiments, the side wall 104 can extend along approximately half of the circumference of the lid ring 102.

A divider wall 106 can extend across the two edges from the bottom wall 110 up to an intermediary height between the bottom wall 110 and the lid ring 102. The two edges 112, 114 of the side wall 104 can be orthogonal relative to the lid ring 102 such that the resulting divider wall 106 is orthogonal to the lid ring 102. In some embodiments, the divider wall 106 can be angled from the bottom wall 110 at a similar angle as the side wall 104 meets the bottom wall 110. The space bounded by the side wall 104, the bottom wall 110, and the divider wall 106 can be understood as a measurement space 180. The dimensions of the side wall 104, the bottom wall 110, and the divider wall 106 can be adjusted or sized and shaped such that the measurement space 180 is of a desired or preset volume. For example, for a set neck 902 size, with the side wall 104 and bottom wall 110 having fixed dimensions, the divider wall 106 can be taller or shorter in order to either provide for more measurement space 180 or less measurement space 180, respectively.

In some embodiments, such as the tapering side wall 104 as shown in FIG. 2, the divider wall 106 can be trapezoidal in shape, with a narrower lower section at the bottom of the tapering side wall 104 than an upper section nearer the lid ring 102. Alternatively, the side wall can take different shapes, with a curved upper section.

The upper edge or top of the divider wall 106 to the bottom wall 110, along a line perpendicular to the surface of the bottom wall 106, defines a dividing height. Similarly, the upper edge or top of the sidewall 104, at the ring 102, along a line perpendicular to the surface of the bottom wall 106, defines a dispenser height. The dispenser height is greater or larger than the dividing height. The difference in the two heights defines a gap. For example, when the dispenser 100 is located with the lid, the gap defines an opening 108 ((FIGS. 6B and 7B) between the upper part of the dividing wall and the flip cover 804.

As such, in manufacturing different dispensers 100 with different sizes of measurement spaces 180, the dispensers 100 can still be stackable in a manufacturing process or for shipping as the only different between measurement sizes is the height of the divider wall 106.

In some embodiments, the side wall 104 can be sized for different sizes of measurement spaces 180 by adjusting the arcuate length that the side wall 104 extends along the circumference of the lid ring 102. By adjustment of the various parameters of the side wall 104, the bottom wall 110, and the divider wall 106, the measurement space 180 can be sized accordingly.

As described, the divider wall 106 extends only to an intermediary height between the bottom wall 110 and the lid ring 102. As the side wall 104 extends only along a section of the lid ring 102, an opening 108 in the dispenser 100 is defined between the dividing wall 106 and a section of the lid ring 102 where the side wall 104 does not extend. The opening 108 provides a through opening between the measurement space 180 and a bottom side of the bottom wall.

The lid ring 102 can define a flange 128 on the bottom surface 126 from the outer diameter 120 to the side wall 104. The flange 128 of the lid ring 102 can be for mating with a container 900 as described below with respect to FIG. 5B.

On the top surface 124 of the lid ring, at least one retaining projection 190 can be provided. The retaining projection 190 can be sized and shaped to engage with a lid 800 of a container assembly. The retaining projection 190 can engage with the lid 800 to prevent rotation of the dispenser 100 relative to the lid 800.

In some embodiments, the retaining projection 190 can be a rectangular projection projecting from the top surface 124 of the lid ring 102. Alternative shapes can be used as appropriate to engage with the lid 800. For example, the retaining projection 190 can be a half dome, triangular, or have a hook shape as necessary.

In some embodiments, the retaining projection 190 can project from the top surface 124 with a footprint from the inner diameter 122 to an intermediary distance between the inner diameter 122 and the outer diameter 120. Alternatively, the retaining projection 190 can project from the top surface 124 with a footprint from the outer diameter 120 to an intermediary distance between the inner diameter 122 and the outer diameter 120. In yet other embodiments, the retaining project can project from the top surface 124 with a footprint located between the inner diameter 122 and the outer diameter 120.

Embodiments of the retaining projection 190 can have a height sufficient to engage with the lid 800 while the lid 800 is rotated to be threadably engaged to a container 900. That is, the retaining projection 190 can fix rotation of the dispenser 100 relative to the lid 800 prior to full seating of the lid 800 to the container 900. For example, the retaining projection 190 can engage with the lid 800 to prevent relative rotation at least half a rotation prior to full seating of the lid 800 to the container 900. Alternatively, it may be beneficial for assembly if the retaining projection 190 can engage with the lid 800 to prevent relative rotation at least one rotation prior to full seating of the lid 800 to the container 900.

In some embodiments, two retaining projections 190 can be provided on the top surface 124. In some embodiments, the two retaining projections can be on opposed sides of the lid ring 102. In other embodiments, the two retaining projections can be spaced apart at a distance other than 180 degrees opposite one another. This can be useful for engaging with asymmetrical features of a lid 800. Additional detail to one such embodiment is provided below with respect to FIGS. 6A-7B.

Additional retaining projections 190 beyond two can be used as desired. Also, in some embodiments, the two or more retaining projections 190 can be similar in shape. Alternatively, in some embodiments, the two or more retaining projections 190 can have at least one projection differently shaped from another.

FIGS. 4A and 4B illustrate the dispenser 100 of FIGS. 1-3 as arranged in an exploded assembly perspective views of a container assembly 1000. FIG. 4A is illustrated from approximately 90 degrees offset from FIG. 4B. The container assembly 1000 can include the dispenser 100, a lid 800, and a container 900.

FIGS. 4A and 4B illustrate a container 900 have a neck 902 and a body 904. As conventionally known, the body 904 can be one of a variety of shapes for storage or aesthetic reasons. In FIGS. 4A and 4B, the body 904 can have a generally rectangular shape.

The lid 800 can have a lid ring body 802, a flip cover 804, and a hinge 806 coupling the lid ring body 802 with the flip cover 804. The lid ring body 802 of the lid 800 and the neck 902 of the container 900 can be sized and shaped for fitment with one another. The lid 800 can be molded as conventionally provided and commercially available. The dispenser 100 for use with the lid 800 can also be molded, such as by plastic injection. The dispenser 100 can be assembled to the lid 800 and used as described herein. In some examples, the dispenser 100 and the lid 800 can be singularly or unitarily formed as a unit. For example, the unitarily formed combination lid and dispenser can be made from or by 3D printing.

FIG. 5A is a side view of the container assembly of FIGS. 4A and 4B. FIG. 5B is a cross-sectional side view of the container assembly of FIG. 5A as taken along section line A-A. The neck 902 can support the flange 128 of the lid 102. In this way, the flange 128 sits on top of the neck 902 and the measurement space 180 of the dispenser 100 extends into the neck 902 of the container 900.

Further to the lid ring body 802 of the lid 800 and the neck 902 of the container 900 being sized and shaped for fitment with one another, the lid ring body 802 can have threading 850 corresponding to threading 950 of the neck 902. The lid 800 can be threadably attached such that it retains the dispenser 100 between the lid 800 and the container 900. The retaining projection 190 can engage with the lid 800 to prevent rotation of the dispenser 100 relative to the lid 800.

In some embodiments, the measurement space 180 of the dispenser is located inside the area defined by the neck 902 of the container. In other embodiments, the measurement space 180 of the dispenser can extend into the body 904 of the container 900.

In the embodiment shown in FIGS. 4A-5B, the lid 800 has a singular flip cover 804. The singular flip cover can be connected to the lid ring body 802 by a hinge 806. The hinge 806 can include a living hinge, a separate hinge component, a linking pin, or other suitable hinging.

In an assembled state of the container assembly 1000, the opening 108 can provide a through space from the measurement space 180 to the body of the container. In operation, it can be envisioned that when the flip cover 804 is in a closed state, such that the container assembly 1000 is in a sealed state, the container can be inverted. An upright state can be understood as the lid 800 being upward relative to the container 900. An inverted state can be understood as the container 900 being upward relative to the lid 800. In the inverted state, an ingredient in the container can settle due to gravity to fill the measurement space 180 and the neck 902 of the container.

When the container assembly 1000 is flipped back to an upright state, the ingredient can settle due to gravity again, with some of the ingredient being retained by the measurement space 180 of the dispenser. Accordingly, the flip cover 804 of the lid 800 can then be opened for dispensing. When the container assembly 1000 is tilted, the ingredient retained by the measurement space can be dispensed, or poured out, to provide the measured quantity.

In some embodiments, the measurement space 180 can be arranged to be on an opposite side of the lid ring 102 from the hinge 806. In other embodiments, the measurement space can be set at an angle relative to the hinge 806. The relative rotation can be determined by the interfacing of the retaining projection 190 and the lid 800.

Alternatively, instead of threading, the lid 800 and the container 900 can be fitted by other means, such as snap fitting. In the absence of threading, the neck portion does not have to be circular in cross section to provide the rotational ability. In such case, other geometric shapes, such as triangular or rectangular cross sections can be provided. In such a case, the neck 902, the lid ring body 802, and the lip ring 102 can be shaped accordingly to correspond to one another to provide arrangement such that the dispenser 100 is retained between the lid 800 and the container 900.

Figure 6B:
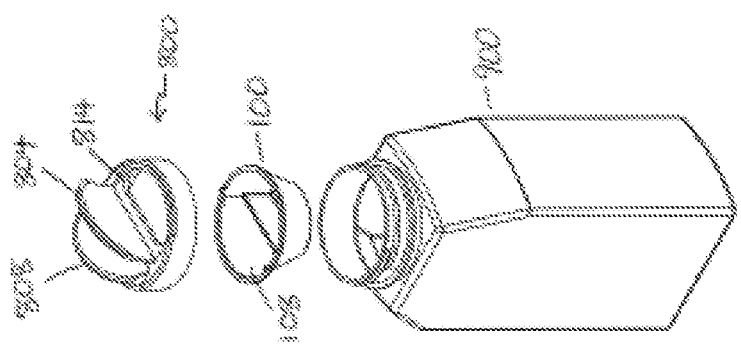
FIGS. 6A and 6B are exploded assembly perspective views of an exemplary embodiment of a container assembly.
Figure 6A:
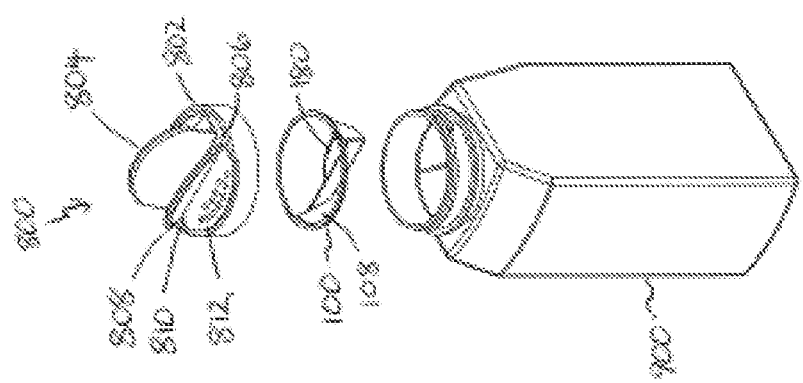

FIGS. 6A and 6B illustrate the dispenser 100 of FIGS. 1-3 as arranged in an exploded assembly perspective views of another embodiment of a container assembly 1000. FIG. 6A is illustrated from approximately 90 degrees offset from FIG. 6B. The container assembly 1000 can include the dispenser 100, a lid 800, and a container 900.

FIGS. 6A and 6B illustrate a container 900 have a neck 902 and a body 904. As conventionally known, the body 904 can be one of a variety of shapes for storage or aesthetic reasons. In FIGS. 6A and 6B, the body 904 can have a generally rectangular shape.

The lid 800 can have a lid ring body 802, a first flip cover 804, a second flip cover 808, and a first hinge 806 coupling the lid ring body 802 with the first flip cover 804, and a second hinge 810 coupling the lid ring body 802 with the second flip cover 808. The lid ring body 802 of the lid 800 and the neck 902 of the container 900 can be sized and shaped for fitment with one another.

Figure 7B:
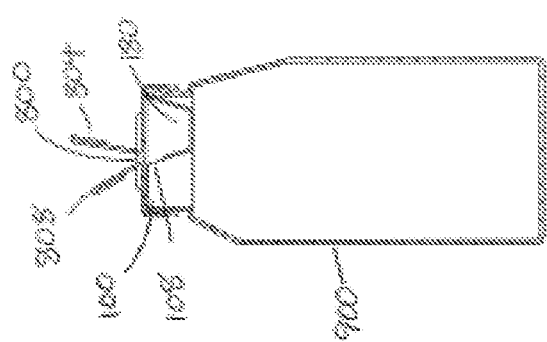
FIG. 7B is a cross-sectional side view of the container assembly of FIG. 7A as taken along section line A-A.

FIG. 7A is a side view of the container assembly of FIGS. 6A and 6B. FIG. 7B is a cross-sectional side view of the container assembly of FIG. 7A as taken along section line A-A. The neck 902 can support the flange 128 of the lid 102. In this way, the flange 128 sits on top of the neck 902 and the measurement space 180 of the dispenser 100 extends into the neck 902 of the container 900.

Further to the lid ring body 802 of the lid 800 and the neck 902 of the container 900 being sized and shaped for fitment with one another, the lid ring body 802 can have threading 850 corresponding to threading 950 of the neck 902. The lid 800 can be threadably attached such that it retains the dispenser 100 between the lid 800 and the container 900. The retaining projection 190 can engage with the lid 800 to prevent rotation of the dispenser 100 relative to the lid 800.

In some embodiments, the measurement space 180 of the dispenser is located inside the area defined by the neck 902 of the container. In other embodiments, the measurement space 180 of the dispenser can extend into the body 904 of the container 900.

In the embodiment shown in FIGS. 6A-7B, the lid 800 has a first flip cover 804 and a second flip cover 808. The first and the second flip cover 804, 808 can be connected to the lid ring body 802 by the first hinge 806 and the second hinge 810, respectively. The hinges can include a living hinge, a separate hinge component, a linking pin, or other suitable hinging. The hinges can be the same type of hinge or different types of hinges. The first flip cover 804 and the second flip cover 808 can be utilized for different pouring methods. For example, the first flip cover 804 can cover an opening 814 without restriction. Separately, the second flip cover 808 can cover a grate 812 of the lid 800, wherein the grate 812 is designed to limit the flow of the ingredient when poured. The grate 812 can be circular cut outs, slits, or other geometric shaped openings.

In an assembled state of the container assembly 1000, the opening 108 can provide a through space from the measurement space 180 to the body of the container. In operation, it can be envisioned that when the first flip cover 804 and the second flip cover 808 are in a closed state, such that the container assembly 1000 is in a sealed state, the container can be inverted. An upright state can be understood as the lid 800 being upward relative to the container 900. An inverted state can be understood as the container 900 being upward relative to the lid 800. In the inverted state, an ingredient in the container can settle due to gravity to fill the measurement space 180 and the neck 902 of the container.

When the container assembly 1000 is flipped back to an upright state, the ingredient can settle due to gravity again, with some of the ingredient being retained by the measurement space 180 of the dispenser. Accordingly, the first flip cover 804 of the lid 800 can then be opened for dispensing. When the container assembly 1000 is tilted, the ingredient retained by the measurement space can be dispensed, or poured out, to provide the measured quantity.

In some embodiments, the measurement space 180 can be arranged to be underneath the first flip cover 804. In this way, the ingredient to be poured from the measurement space can be poured out of the container 900 from the first flip cover 804. As the measurement is already done by the measurement space 180, there is no need to limit the rate of pour such as with the grate 812. In other embodiments, the measurement space 180 can be arranged to be underneath the second flip cover 804 and the grating 812. In this way, the dispenser 100 does not block a person from inserting a measuring spoon or utensil through the first flip cover 804 for direct access to the ingredient. The relative rotation can be determined by the interfacing of the retaining projection 190 and the lid 800. In some embodiments, the retaining projection can engage with a middle portion of the lid 800 between the first hinge 806 and the second hinge 810.

Alternatively, instead of threading, the lid 800 and the container 900 can be fitted by other means, such as snap fitting. In the absence of threading, the neck portion does not have to be circular in cross section to provide the rotational ability. In such case, other geometric shapes, such as triangular or rectangular cross sections can be provided. In such a case, the neck 902, the lid ring body 802, and the lip ring 102 can be shaped accordingly to correspond to one another to provide arrangement such that the dispenser 100 is retained between the lid 800 and the container 900.

FIGS. 8A and 8B are exploded assembly perspective views of an exemplary embodiment of a container assembly. FIG. 8A is illustrated from approximately 90 degrees offset from FIG. 8B. The container assembly 1000 can include the dispenser 100, a lid 800, and a container 900.

FIGS. 8A and 8B illustrate a container 900 have a neck 902 and a body 904. As conventionally known, the body 904 can be one of a variety of shapes for storage or aesthetic reasons. In FIGS. 8A and 8B, the body 904 can have a generally rectangular shape.

The lid 800 can have a lid ring body 802, a flip cover 804, and a hinge 806 coupling the lid ring body 802 with the flip cover 804. The lid ring body 802 of the lid 800 and the neck 902 of the container 900 can be sized and shaped for fitment with one another.

FIG. 9 is a side view of the container assembly of FIGS. 8A and 8B. Further to the lid ring body 802 of the lid 800 and the neck 902 of the container 900 being sized and shaped for fitment with one another, the lid ring body 802 can have threading 850 corresponding to threading 950 of the neck 902.

The dispenser 100 can have a hinge 170 to the lid 800 such that it is rotatably hinged to the lid 800 through an opening 816 of the lid 800. The dispenser 100 can be hinged to the lid ring body 802, such that it can rotate radially outward relative to a central axis of the lid 800. In some embodiments, the dispenser can have a measurement space 180 generally defined by a circular side wall 104 and a bottom wall 110. In other embodiments, different geometric shapes can define the measurement space 180.

In the embodiment shown in FIGS. 8A-9, the lid 800 has a singular flip cover 804. The singular flip cover can be connected to the lid ring body 802 by a hinge 806. The hinge 806 can include a living hinge, a separate hinge component, a linking pin, or other suitable hinging.

In an assembled state of the container assembly 1000, the dispenser can be smaller than the cross sectional area of the neck 902 such that there is a through space from the measurement space 180 to the body of the container. In operation, it can be envisioned that when the flip cover 804 is in a closed state, such that the container assembly 1000 is in a sealed state, the container can be inverted. An upright state can be understood as the lid 800 being upward relative to the container 900. An inverted state can be understood as the container 900 being upward relative to the lid 800. In the inverted state, an ingredient in the container can settle due to gravity to fill the measurement space 180 and the neck 902 of the container.

When the container assembly 1000 is flipped back to an upright state, the ingredient can settle due to gravity again, with some of the ingredient being retained by the measurement space 180 of the dispenser. Afterwards, the flip cover 804 of the lid 800 can then be opened for dispensing, or the dispenser can be rotated about its hinge out of the lid 800 for dispensing. When the container assembly 1000 is tilted, the ingredient retained by the measurement space 180 can be dispensed, or poured out, to provide the measured quantity.

In some embodiments, the measurement space 180 can be arranged to be on an opposite side of the lid ring 102 from the hinge 806. In other embodiments, the measurement space can be set at an angle relative to the hinge 806. The relative rotation can be determined by the interfacing of the retaining projection 190 and the lid 800.

In some embodiments, the lid ring body 802 can be sized such that the dispenser 100 is on top of the neck 902 of the container 900. In other embodiments, the neck 902 can have a cut out or taper sufficient for rotation of the hinged dispenser 100 out of the neck 902.

Alternatively, instead of threading, the lid 800 and the container 900 can be fitted by other means, such as snap fitting. In the absence of threading, the neck portion does not have to be circular in cross section to provide the rotational ability. In such case, other geometric shapes, such as triangular or rectangular cross sections can be provided. In such a case, the neck 902, the lid ring body 802, and the dispenser 100 can be shaped accordingly to correspond to one another to provide arrangement such that the dispenser 100 is retained between the lid 800 and the container 900.

Analogous methods of making and of using the dispenser 100 and the container assembly 1000 of FIGS. 1-9 are understood to be encompassed herein.

Additionally, embodiments can be understood for usage of containers of a variety of substances, not just for kitchen ingredients.

Although limited embodiments of dispenser and container assemblies, their components, and related methods have been specifically described and illustrated herein, many modifications and variations will be apparent to those skilled in the art. For example, the various contoured surfaces may be modified so long as a measurement space is provided for the ingredient to fill. Furthermore, it is understood and contemplated that features specifically discussed for one dispenser embodiment may be adopted for inclusion with another dispenser embodiment, provided the functions are compatible. Accordingly, it is to be understood that the dispenser and the container assemblies, and related methods constructed according to principles of the disclosed devices, systems, and methods may be embodied other than as specifically described herein. The disclosure is also defined in the following claims.

What is claimed is:

1. A dispenser for use with a container containing an ingredient, the dispenser comprising:
a flange defining a plane, the flange having an outer perimeter, an inner perimeter, a passage through the inner perimeter, a first side relative to the plane, and an opposed second side relative to the plane;
a sidewall projecting downwardly from part of the flange on the second side of the plane such that that the sidewall extends less than a full circumference of the inner perimeter of the flange;
a bottom wall projecting from the sidewall;
a divider wall connected to the sidewall and to the bottom wall but spaced from the flange, the divider wall comprising a first side, a second side, and an upper edge;
a measurement space defined by the sidewall, the bottom wall, and the first side of the divider wall;
a gap between the plane defined by the flange and the upper edge of the divider wall; and
wherein part of the inner circumference of the flange is unobstructed on the second side.

2. The dispenser according to claim 1, wherein the flange comprises a circular ring.

3. The dispenser according to claim 1, wherein the sidewall extends part of the outer perimeter of the flange and the divider wall connects to edges of the sidewall.

4. The dispenser according to claim 1, wherein the flange rests on an opening perimeter of a neck of a container.

5. The dispenser according to claim 4, further comprising a lid attached to the neck, the lid comprising a flip cover.

6. The dispenser according to claim 1,
wherein the sidewall projects orthogonally from the flange and has an arcuate arc shape.

7. The dispenser according to claim 6,
wherein the bottom wall is planar and has a first surface and a second surface; and
wherein the sidewall and the dividing wall are both on the first surface side of the bottom wall.

8. A container assembly comprising:
a lid having a hinge and a lid ring body;
a dispenser having a predetermined measurement space;
a container having an open top and a closed bottom;
wherein the dispenser is positioned between the lid and the container and the lid is threaded to the container at the open top of the container;
wherein the dispenser comprises a flange defining a plane, the flange having an outer perimeter, an inner perimeter, a first side relative to the plane, a second side relative to the plane, a less than full circumference sidewall having two edges angled to the plane projecting downwardly on the second side of the flange from only part of the flange, a bottom wall projecting from the sidewall, and a divider wall comprising a first side and a second side connected to the two edges of the sidewall and to the bottom wall but spaced from the flange; and
wherein a measurement space is located on the first side of the divider wall.

9. The container assembly according to claim 8, wherein the divider wall is tapered relative to the plane and has an upper edge that is spaced from the flange.

10. The container assembly according to claim 9,
wherein the lid comprises a hinged flip cover.

11. The container assembly according to claim 10, wherein the flange of the dispenser is seated on a neck of the container.

12. The container assembly according to claim 10, wherein when the hinged flip cover is flipped open, a through opening and the measurement space are exposed through the lid.

13. The container assembly according to claim 8, wherein the lid and the dispenser are unitarily formed.

14. The container assembly according to claim 8, wherein a retaining projection is located between the flange of the dispenser and the lid to prevent rotation of the dispenser relative to the lid.

15. The container assembly according to claim 14,
wherein the sidewall of the dispenser is tapered relative to the plane.

16. The dispenser according to claim 15, wherein the retaining projection is a first retaining projection and wherein a second retaining projection is located between the flange of the dispenser and the lid to prevent rotation of the dispenser relative to the lid.

17. A method for assembling a container assembly comprising:
fitting a lid with a dispenser onto a container, the lid comprising a hinge and a lid ring body and the dispenser comprising body with a flange defining a plane, the flange having an outer perimeter, an inner perimeter, a first side relative to the plane, a second side relative to the plane, a sidewall having two sidewall edges extending downwardly on the second side from only part of the flange, a bottom wall, and a dividing wall;
wherein the flange, the sidewall, the bottom wall, and the dividing wall define a measurement space;
wherein the dividing wall is connected to the two sidewall edges; and
wherein a gap is provided between an upper surface of the dividing wall and the flip cover.

18. The method according to claim 17,
wherein the sidewall and the dividing wall are both tapered relative to the plane.

19. The method according to claim 17, wherein at least one projection is located between the flange of the dispenser and the lid to prevent rotation between the dispenser and the lid.

20. The method of claim 17, wherein the sidewall and the dividing wall are recessed from a cylinder defined by the flange.

* * * * *